US008577505B2

(12) United States Patent
Foslien et al.

(10) Patent No.: US 8,577,505 B2
(45) Date of Patent: Nov. 5, 2013

(54) ENERGY-RELATED INFORMATION PRESENTATION SYSTEM

(75) Inventors: Wendy Foslien, Woodbury, MN (US);
Thomas Gall, Solon, OH (US); Rob Trout, Cuyahoga Falls, OH (US); Jake Mayher, North Olmsted, OH (US);
Joseph S. Majewski, Strongsville, OH (US); Paul Kleinhans, Cuyahoga Falls, OH (US); Ayman Mohamed, North Royalton, OH (US)

(73) Assignee: Honeywell International Inc., Morristown, NJ (US)

( * ) Notice: Subject to any disclaimer, the term of this patent is extended or adjusted under 35 U.S.C. 154(b) by 392 days.

(21) Appl. No.: 13/015,545

(22) Filed: Jan. 27, 2011

(65) Prior Publication Data

US 2011/0184563 A1    Jul. 28, 2011

Related U.S. Application Data

(60) Provisional application No. 61/336,789, filed on Jan. 27, 2010.

(51) Int. Cl.
*G06F 19/00* (2011.01)

(52) U.S. Cl.
USPC .......................................... 700/275; 702/181

(58) Field of Classification Search
USPC .......................................... 700/275; 702/181
See application file for complete search history.

(56) References Cited

U.S. PATENT DOCUMENTS

| | | | |
|---|---|---|---|
| 4,918,615 A | 4/1990 | Suzuki et al. | |
| 4,939,922 A | 7/1990 | Smalley et al. | |
| 5,566,084 A | 10/1996 | Cmar | |
| 5,745,126 A | 4/1998 | Jain et al. | |
| 5,751,916 A | 5/1998 | Kon et al. | |
| 5,777,598 A | 7/1998 | Gowda et al. | |

(Continued)

FOREIGN PATENT DOCUMENTS

| CA | 2538139 A1 | 3/2005 |
|---|---|---|
| EP | 1669912 A1 | 6/2006 |

(Continued)

OTHER PUBLICATIONS

Narang, "WEBARC: Control and Monitoring of Building Systems Over the Web," 53 pages, May 1999.

(Continued)

*Primary Examiner* — Michael D Masinick
(74) *Attorney, Agent, or Firm* — Seager Tufte & Wickhem LLC.

(57) ABSTRACT

A system and approach for diagnostic visualizations of, for example, building control systems data. A focus may be on a similarity metric for comparing operations among sites relative to energy consumption. Normalizing factors may be used across sites with varying equipment consumption levels to be compared automatically. There may also be a high level overview of an enterprise of sites. For instance, consumption totals of the sites may be normalized by site size and length of time of a billing period to identify such things as outlier sites. One may use a main view of geographic distribution dynamically linked to subviews showing distribution by size, by aggregated climate, and so on. With these views, one may quickly drill through the enterprise and identify sites of interest for further investigation. A key metric may be intensity which invokes viewing virtually all sites by normalized consumption for a unit amount of time.

7 Claims, 21 Drawing Sheets

(56) References Cited

U.S. PATENT DOCUMENTS

| | | | |
|---|---|---|---|
| 6,065,842 A | 5/2000 | Fink | |
| 6,139,177 A | 10/2000 | Venkatraman et al. | |
| 6,144,993 A | 11/2000 | Fukunaga et al. | |
| 6,157,943 A | 12/2000 | Meyer et al. | |
| 6,229,429 B1 | 5/2001 | Horon | |
| 6,334,211 B1 | 12/2001 | Kojima et al. | |
| 6,353,853 B1 | 3/2002 | Gravlin | |
| 6,369,695 B1 | 4/2002 | Horon | |
| 6,429,868 B1 | 8/2002 | Dehner, Jr. | |
| 6,473,084 B1 | 10/2002 | Phillips et al. | |
| 6,487,457 B1 | 11/2002 | Hull et al. | |
| 6,580,950 B1 | 6/2003 | Johnson et al. | |
| 6,598,056 B1 | 7/2003 | Hull et al. | |
| 6,619,555 B2 | 9/2003 | Rosen | |
| 6,704,012 B1 | 3/2004 | Lefave | |
| 6,741,915 B2 | 5/2004 | Poth | |
| 6,796,896 B2 | 9/2004 | Laiti | |
| 6,801,199 B1 | 10/2004 | Wallman | |
| 6,816,878 B1 | 11/2004 | Zimmers et al. | |
| 6,876,951 B2 | 4/2005 | Skidmore | |
| 6,904,385 B1 | 6/2005 | Budike, Jr. | |
| 6,907,387 B1 | 6/2005 | Reardon | |
| 6,993,403 B1 | 1/2006 | Dadebo et al. | |
| 6,993,417 B2 | 1/2006 | Osann, Jr. | |
| 7,023,440 B1 | 4/2006 | Havekost et al. | |
| 7,031,880 B1* | 4/2006 | Seem et al. | 702/182 |
| 7,062,722 B1 | 6/2006 | Carlin et al. | |
| 7,110,843 B2 | 9/2006 | Pagnano et al. | |
| 7,139,685 B2 | 11/2006 | Bascle et al. | |
| 7,164,972 B2 | 1/2007 | Imhof et al. | |
| 7,183,899 B2 | 2/2007 | Behnke | |
| 7,200,639 B1 | 4/2007 | Yoshida | |
| 7,222,800 B2 | 5/2007 | Wruck | |
| 7,257,397 B2 | 8/2007 | Shamoon et al. | |
| 7,280,030 B1 | 10/2007 | Monaco | |
| 7,292,908 B2 | 11/2007 | Borne et al. | |
| 7,308,388 B2 | 12/2007 | Beverina et al. | |
| 7,313,447 B2* | 12/2007 | Hsiung et al. | 700/9 |
| 7,346,433 B2 | 3/2008 | Budike, Jr. | |
| 7,356,548 B1 | 4/2008 | Culp et al. | |
| 7,379,782 B1 | 5/2008 | Cocco | |
| 7,383,148 B2 | 6/2008 | Ahmed | |
| 7,434,742 B2 | 10/2008 | Mueller et al. | |
| 7,496,472 B2* | 2/2009 | Seem | 702/181 |
| 7,512,450 B2 | 3/2009 | Ahmed | |
| 7,516,490 B2 | 4/2009 | Riordan et al. | |
| 7,548,833 B2 | 6/2009 | Ahmed | |
| 7,557,729 B2 | 7/2009 | Hubbard et al. | |
| 7,567,844 B2 | 7/2009 | Thomas et al. | |
| 7,596,473 B2 | 9/2009 | Hansen et al. | |
| 7,610,910 B2 | 11/2009 | Ahmed | |
| 7,626,507 B2 | 12/2009 | LaCasse | |
| 7,664,574 B2 | 2/2010 | Imhof et al. | |
| 7,702,421 B2 | 4/2010 | Sullivan et al. | |
| 7,729,882 B2* | 6/2010 | Seem | 702/181 |
| 7,774,227 B2 | 8/2010 | Srivastava | |
| 7,797,188 B2 | 9/2010 | Srivastava | |
| 7,856,370 B2 | 12/2010 | Katta et al. | |
| 7,986,323 B2 | 7/2011 | Kobayashi et al. | |
| 8,024,666 B2 | 9/2011 | Thompson | |
| 8,086,047 B2 | 12/2011 | Penke et al. | |
| 2002/0111698 A1 | 8/2002 | Graziano et al. | |
| 2002/0130868 A1 | 9/2002 | Smith | |
| 2003/0028269 A1 | 2/2003 | Spriggs et al. | |
| 2003/0030637 A1 | 2/2003 | Grinstein et al. | |
| 2003/0046862 A1 | 3/2003 | Wolf et al. | |
| 2003/0071814 A1 | 4/2003 | Jou et al. | |
| 2003/0083957 A1 | 5/2003 | Olefson | |
| 2003/0103075 A1 | 6/2003 | Rosselot | |
| 2003/0171851 A1 | 9/2003 | Brickfield et al. | |
| 2003/0214400 A1 | 11/2003 | Mizutani et al. | |
| 2003/0233432 A1 | 12/2003 | Davis et al. | |
| 2004/0064260 A1 | 4/2004 | Padmanabhan et al. | |
| 2004/0143474 A1 | 7/2004 | Haeberle et al. | |
| 2004/0168115 A1 | 8/2004 | Bauernschmidt et al. | |
| 2004/0233192 A1 | 11/2004 | Hopper | |
| 2004/0260411 A1 | 12/2004 | Cannon | |
| 2005/0010460 A1 | 1/2005 | Mizoguchi et al. | |
| 2005/0143863 A1 | 6/2005 | Ruane et al. | |
| 2005/0267900 A1 | 12/2005 | Ahmed et al. | |
| 2006/0004841 A1 | 1/2006 | Heikkonen et al. | |
| 2006/0009862 A1 | 1/2006 | Imhof et al. | |
| 2006/0017547 A1 | 1/2006 | Buckingham et al. | |
| 2006/0020177 A1 | 1/2006 | Seo | |
| 2006/0028471 A1 | 2/2006 | Kincaid | |
| 2006/0029256 A1 | 2/2006 | Miyoshi et al. | |
| 2006/0058900 A1 | 3/2006 | Johanson et al. | |
| 2006/0077255 A1 | 4/2006 | Cheng | |
| 2006/0184326 A1 | 8/2006 | McNally et al. | |
| 2006/0265664 A1 | 11/2006 | Simons et al. | |
| 2006/0279630 A1 | 12/2006 | Aggarwal et al. | |
| 2007/0016955 A1 | 1/2007 | Goldberg et al. | |
| 2007/0055760 A1 | 3/2007 | McCoy et al. | |
| 2007/0088534 A1 | 4/2007 | MacArthur et al. | |
| 2007/0090951 A1 | 4/2007 | Chan et al. | |
| 2007/0091091 A1 | 4/2007 | Gardiner et al. | |
| 2007/0114295 A1 | 5/2007 | Jenkins | |
| 2007/0120652 A1 | 5/2007 | Behnke | |
| 2007/0139208 A1 | 6/2007 | Kates | |
| 2007/0216682 A1 | 9/2007 | Navratil et al. | |
| 2007/0268122 A1 | 11/2007 | Kow et al. | |
| 2008/0027885 A1 | 1/2008 | van Putten et al. | |
| 2008/0036593 A1 | 2/2008 | Rose-Pehrsson et al. | |
| 2008/0062167 A1 | 3/2008 | Boggs et al. | |
| 2008/0144885 A1 | 6/2008 | Zucherman et al. | |
| 2008/0183424 A1* | 7/2008 | Seem | 702/181 |
| 2008/0198231 A1 | 8/2008 | Ozdemir et al. | |
| 2008/0224862 A1 | 9/2008 | Cirker | |
| 2008/0306985 A1 | 12/2008 | Murray et al. | |
| 2008/0320552 A1 | 12/2008 | Kumar et al. | |
| 2009/0001181 A1 | 1/2009 | Siddaramanna et al. | |
| 2009/0083120 A1* | 3/2009 | Strichman et al. | 705/10 |
| 2009/0096791 A1 | 4/2009 | Abshear et al. | |
| 2009/0125825 A1 | 5/2009 | Rye et al. | |
| 2009/0144023 A1* | 6/2009 | Seem | 702/181 |
| 2009/0157744 A1 | 6/2009 | McConnell | |
| 2009/0160673 A1 | 6/2009 | Cirker | |
| 2010/0048167 A1 | 2/2010 | Chow et al. | |
| 2010/0064001 A1 | 3/2010 | Daily | |
| 2010/0156628 A1 | 6/2010 | Ainsbury et al. | |
| 2010/0156630 A1 | 6/2010 | Ainsbury | |
| 2010/0223198 A1 | 9/2010 | Noureldin et al. | |
| 2010/0249955 A1 | 9/2010 | Sitton | |
| 2010/0318200 A1 | 12/2010 | Foslien et al. | |
| 2011/0077754 A1 | 3/2011 | Jones et al. | |
| 2011/0077779 A1 | 3/2011 | Fuller et al. | |
| 2011/0083094 A1 | 4/2011 | Laycock et al. | |
| 2012/0262472 A1 | 10/2012 | Garr et al. | |
| 2013/0055132 A1 | 2/2013 | Foslien | |

FOREIGN PATENT DOCUMENTS

| | | |
|---|---|---|
| JP | 7085166 | 3/1995 |
| JP | 11024735 A | 1/1999 |
| JP | 11317936 A | 11/1999 |
| JP | 2001356813 A | 12/2001 |
| JP | 2005242531 A | 9/2005 |
| JP | 2005311563 A | 11/2005 |
| WO | 9621264 A3 | 11/1996 |
| WO | 2004029518 A1 | 4/2004 |
| WO | 2005045715 A2 | 5/2005 |
| WO | 2008157755 A1 | 12/2008 |
| WO | 2009079648 A1 | 6/2009 |
| WO | 2010106474 A1 | 9/2010 |

OTHER PUBLICATIONS

Olken et al., "Object Lessons Learned from a Distributed System for Remote Building Monitoring and Operation," ACM SIGPLAN Notices, vol. 33, No. 10, pp. 284-295, Oct. 1998.

Proliphix, Inc., "Proliphix IP Devices: HTTP API," 28 pp., Jan. 23, 2006.

Proliphix, Inc., Remote Management User Guide, 12 pages, prior to Aug. 27, 2007.

(56) References Cited

OTHER PUBLICATIONS

Richard Rogan et al., "Smart and Final Food Stores: A Case Study in Web Based Energy Information and Collection," Web Based Energy Information and Control Systems: Case Studies and Application, Chapter 6, pg. 59-64, 2005.
Sharp, "Actius AL3DU 3D LC Display High Performance 3D Visualization," 2 pages, prior to Mar. 17, 2006.
So et al., "Building Automation on the Information Superhighway," ASHRAE (American Society of Heating Refrigerating, and Air Conditioning) Transactions, vol. 104, Part 2, pp. 176-191, 1998.
So et al., "Building Automation Systems on the Internet," Facilities vol. 15, No. 5/6, pp. 125-133, May/Jun. 1997.
Talon, "Raptor Controller," 6 pages, Oct. 2003.
Talon, "Workstation Software," 4 pages, Nov. 2002.
Trane, "System Programming, Tracer Summit Version 14, BMTW-SVP01D-EN," 623 pages, 2002.
Lucid Design Group, Inc., "Building Dashboard," 2 pages, Printed May 30, 2013.
"ASHRAE Dashboard Research Project," 29 pages, Aug. 28, 2008.
"Energy Manager User Guide," Release 3.2, Honeywell, 180 pages, 2008.
"Fuzzy Logic Toolbox 2.1, Design and Stimulate Fuzzy Logic Systems," The MathWorks, 2 pages, May 2004.
"Junk Charts, Recycling Chartjunk as junk art," 3 pages, Oct. 2, 2006.
"Model Predictive Control Toolbox 2, Develop Internal Model-Based Controllers for Constrained Multivariable Processes," The MathWorks, 4 pages, Mar. 2005.
Honeywell, "Product Guide 2004," XP-002472407, 127 pages, 2004.
"Statistics Toolbox, for Use with Matlab," User's Guide Version2, The MathWorks, 408 pages, Jan. 1999.
"Vykon Energy Suite Student Guide," Tridium Inc., 307 pages, Mar. 3, 2006.
"Web Based Energy Information Systems for Energy Management and Demand Response in Commercial Buildings," California Energy Commission, 80 pages, Oct. 2003.
Andover Controls, Network News, vol. 2, No. 2, 8 pages, 1997.
Andover Controls World, 4 pages, Spring 1997.
Bell, Michael B. et al., "Early Event Detection-Results from a Prototype Implementation," AICHE Spring National Meeting, 15 pages, Apr. 2005.
Cadgraphics, "The Cadgraphics User's Guide," 198 pages, 2003.
Carrier Comfort Network CCN Web, "Web Browser User Interface to the Carrier Comfort Network," 2 pages, 2002.
Carrier Comfort Network CCN Web, Overview and Configuration Manual, 134 pages, Apr. 2006.
Carrier Comfort Network CCN Web, Product Data, 2 pages, Apr. 2006.
Carrier, "i-Vu Powerful and Intuitive Front End for Building Control," 2 pages, Aug. 2005.
Carrier, "i-Vu Web-Based Integrated Control System," 3 pages, 2005.
Carrier, Demo Screen Shots, 15 pages, prior to Aug. 27, 2007.
Carrier, i-Vu CCN 4.0, Owner's Guide, 20 pages, Jul. 2007.
Carrier, i-Vu CCN, 7 pages, 2007.
Chan, "Rank Revealing QR Factorizations," Linear Algebra and It's Applications, vol. 88-89, pg. 67-82, Apr. 1987.
Circon, "i-Browse Web-Based Monitoring and Control for Facility Management," 2 pages, prior to Aug. 27, 2007.
Published Australian Application 2009904740, 28 pages, Application Filed on Sep. 29, 2009.
Echelon, "Energy Control Solutions with the i.Lon SmartServer," 4 pages, 2007.
Echelon, "i.Lon 100e3 Internet Server Models 72101R-300, 72101R-308, 72102R-300, 72103-R300 . . ." 5 pages, copyright 2002-2007.
Echelon, "i.Lon 100e3 Internet Server New Features," 15 pages, Sep. 2006.
Echelon, "i.Lon SmartServer," 5 pages, 2007.
Honeywell News Release, "Honeywell's New Sysnet Facilities Integration System for Boiler Plant and Combustion Safety Processes," 4 pages, Dec. 15, 1995.
Honeywell, "Excel Building Supervisor-Integrated R7044 and FS90 Ver. 2.0," Operator Manual, 70 pages, Apr. 1995.
Honeywell, "Introduction of the S7350A Honeywell WebPAD Information Appliance," Home and Building Control Bulletin, 2 pages, Aug. 29, 2000; Picture of WebPad Device with touch screen, 1 page; and screen shots of WebPad Device, 4 pages.
Honeywell, Excel 15B W7760B Building Manager Release 2.02.00, Installation Instructions, 28 pages, Dec. 2004.
Honeywell, The RapidZone Solution, Excel 5000 Open System, Application Guide, 52 pages, Jan. 2004.
http://pueblo.lbl.gov/~olken..., "Remote Building Monitoring and Operations Home p.," 5 pages, prior to Aug. 27, 2007.
http://www.commercial.carrier.com/commercial/hvac/productdescription..., "Carrier: i-Vu CCN," 1 page, printed Mar. 11, 2008.
http://www.commercial.carrier.com/commercial/hvac/productdescription..., "Carrier: 33CSCCNWEB-01 CCNWeb Internet Connection to the Carrier Comfort Network," 1 page, printed Mar. 11, 2008.
http://www.docs.hvacpartners.com/idc/groups/public/documents/techlit/gs-controls-ivuccn.rtf, "Products," 5 pages, printed Jul. 3, 2007.
http://www.lightstat.com/products/istat.asp, Lightstat Incorporated, "Internet Programmable Communicating Thermostats," 1 page, printed Mar. 13, 2007.
http://www.sharpsystems.com/products/pc_notebooks/actius/rd/3d/, "Actius RD3D Desktop Replacement Notebook with Industry-Breakthrough 3D Screen," Sharp, 1 page, printed Jun. 16, 2005.
http://www2.sims.berkeley.edu/courses/is213/s06/projects/lightson:final.html, "Lights on a Wireless Lighting Control System," 11 pages, printed Mar. 22, 2007.
i.Lon 100e3 Internet Server, 1 page, prior to Aug. 27, 2007.
i.Lon, SmartServer, 2 pages, prior to Aug. 27, 2007.
i-stat, Demo Screen Shots, 9 pages, printed Mar. 13, 2007.
i-stat, The Internet Programmable Thermostat, 2 pages, prior to Aug. 27, 2007.
Jeffrey Ball, "Green Goal of 'Carbon Neutrality' Hits Limit," TheWall Street Journal, 7 pages, Dec. 30, 2008.
Johnson Controls, Network Integration Engine (NIE) 3 pages, Nov. 9, 2007.
Johnson Controls, Network Integration Engine (NIE), Product Bulletin, pp. 1-11, Jan. 30, 2008.
Kourti, Theodora, "Process Analysis and Abnormal Situation Detection: From Theory to Practice," IEEE Control Systems Magazine, pg. 10-25, Oct. 2002.
Mathew, Paul A., "Action-Oriented Benchmarking, Using CEUS Date to Identify and Prioritize Efficiency Opportunities in California Commercial Buildings," 26 pages, Jun. 2007.
Morrison, Don et al., "The Early Event Detection Toolkit," Honeywell Process Solutions, 14 pages, Jan. 2006.

\* cited by examiner $$\beta_{i,j} = \frac{\sum_{nUnits} \alpha_{i,j,k}}{nUnits}$$

*Figure 7*

| Alpha Calculations (total run hours): | | |
|---|---|---|
| SITE_ID | RTUStage | Alpha |
| 333 | FAN | 88001 |
| 2507 | COOL 1 | 60404 |
| 2507 | FAN | 55166 |
| 333 | COOL 1 | 47969 |
| 2652 | FAN | 24538 |
| 2652 | COOL 1 | 23164 |
| 333 | HEAT 1 | 20300 |
| 333 | COOL 2 | 11900 |
| 2507 | COOL 2 | 9967 |
| 2459 | FAN | 1689 |
| 2459 | COOL 1 | 1324 |
| 2459 | COOL 2 | 428 |
| 2652 | COOL 2 | 414 |
| 2459 | HEAT 1 | 0 |
| 2507 | HEAT 1 | 0 |
| 2652 | HEAT 1 | 0 |
| 333 | HEAT 2 | 0 |
| 2459 | HEAT 2 | 0 |
| 2507 | HEAT 2 | 0 |
| 2652 | HEAT 2 | 0 |

Beta Calculations (percent run hours):

| SITE_ID | RTUStage | NRTUS | Beta |
|---|---|---|---|
| 333 | FAN | 10 | 40.55 |
| 2507 | COOL 1 | 7 | 39.77 |
| 2507 | FAN | 7 | 36.32 |
| 333 | COOL 1 | 10 | 22.11 |
| 2652 | FAN | 6 | 18.85 |
| 2652 | COOL 1 | 6 | 17.79 |
| 333 | HEAT 1 | 10 | 9.35 |
| 333 | COOL 2 | 10 | 5.48 |
| 2507 | COOL 2 | 7 | 6.56 |
| 2459 | FAN | 4 | 1.95 |
| 2459 | COOL 1 | 4 | 1.53 |
| 2459 | COOL 2 | 4 | 0.49 |
| 2652 | COOL 2 | 6 | 0.32 |
| 2459 | HEAT 1 | 4 | 0.00 |
| 2507 | HEAT 1 | 7 | 0.00 |
| 2652 | HEAT 1 | 6 | 0.00 |
| 333 | HEAT 2 | 10 | 0.00 |
| 2459 | HEAT 2 | 4 | 0.00 |
| 2507 | HEAT 2 | 7 | 0.00 |
| 2652 | HEAT 2 | 6 | 0.00 |

Comparing site 2507 to the following nearby sites:

2652 (3.180099 miles)
333 (7.822641 miles)
2455 (9.811899 miles)
2460 (13.022389 miles)
2459 (14.759224 miles)
555 (15.499398 miles)

RTUAlphaView

| SITE_ID | DL_PNT_NM | COOL 1 | COOL 2 | FAN | HEAT 1 |
|---|---|---|---|---|---|
| 333 | RT 1 CHECKOUT | ○ | | ○ | |
| | RT 2 CUST SERV | ∘ | | ○ | |
| | RT 4 HIGH TECH | ○ | ○ | ○ | |
| | RT 5 OFF SPPLY R | ○ | | ○ | |
| | RT 6 FURNITURE | ∘ | | ○ | |
| | RT 7 OFF/TRAININ | ○ | | ○ | |
| | RT 9 BSNS SERV | | | ○ | |
| | RT 10 STORAGE | | | ○ | ○ |
| 2459 | RT1*Front Sales | ∘ | | ∘ | |
| | RT2 Center Sales | ∘ | | ∘ | |
| | RT3 Rear Sales | ∘ | | ∘ | |
| | RT4*Off/Lnge/RR | | | | |
| 2507 | RT1*FRONT RIGHT | ● | ● | ● | |
| | RT3 CENTER RIGHT | · | · | · | |
| | RT4*CENTER LEFT | ● | ● | ● | |
| | RT5 REAR RIGHT | · | | · | |
| | RT6*REAR LEFT | ● | ● | ● | |
| | RT7*OFFICE/BRK | ○ | | | |
| 2652 | RT1*FR | ∘ | ∘ | ○ | |
| | RT4*RR | | | ∘ | |
| | RT6*OFFICE | ∘ | | ∘ | |

*Figure 11A*

ENERGY-RELATED INFORMATION PRESENTATION SYSTEM

This application claims the benefit of U.S. Provisional Application No. 61/336,789, filed Jan. 27, 2010, and entitled "Integrated Multi-Site Energy Dashboard". U.S. Provisional Application No. 61/336,789, filed Jan. 27, 2010, is hereby incorporated by reference.

BACKGROUND

The present disclosure pertains to energy usage and particularly to an apparatus and approach for displaying energy-related information.

SUMMARY

The disclosure reveals a system and approach for diagnostic visualizations of, for example, building control systems data. A focus may be on a similarity metric for comparing operations among sites relative to energy consumption. Normalizing factors may be used across sites with varying equipment consumption levels to be compared automatically. There may also be a high level overview of an enterprise of sites. For instance, consumption totals of the sites may be normalized by site size and length of time of a billing period to identify such things as outlier sites. One may use a main view of geographic distribution dynamically linked to sub-views showing distribution by size, by aggregated climate, and so on. With these views, one may quickly drill through the enterprise and identify sites of interest for further investigation. A key metric may be intensity which invokes viewing virtually all sites by normalized consumption for a unit amount of time.

BRIEF DESCRIPTION OF THE DRAWING

FIG. 7 is a diagram of a formula for calculating a beta factor;

FIGS. 10a and 10b are tables of alpha and beta calculations, respectively, for various sites;

FIG. 10c is a table of distances of other sites nearby a noted site of interest in FIGS. 10a and 10b;

FIGS. 11a and 11b are diagrams of alpha calculations for various sites for roof top units and lights, respectively;

DESCRIPTION

Figure 1:
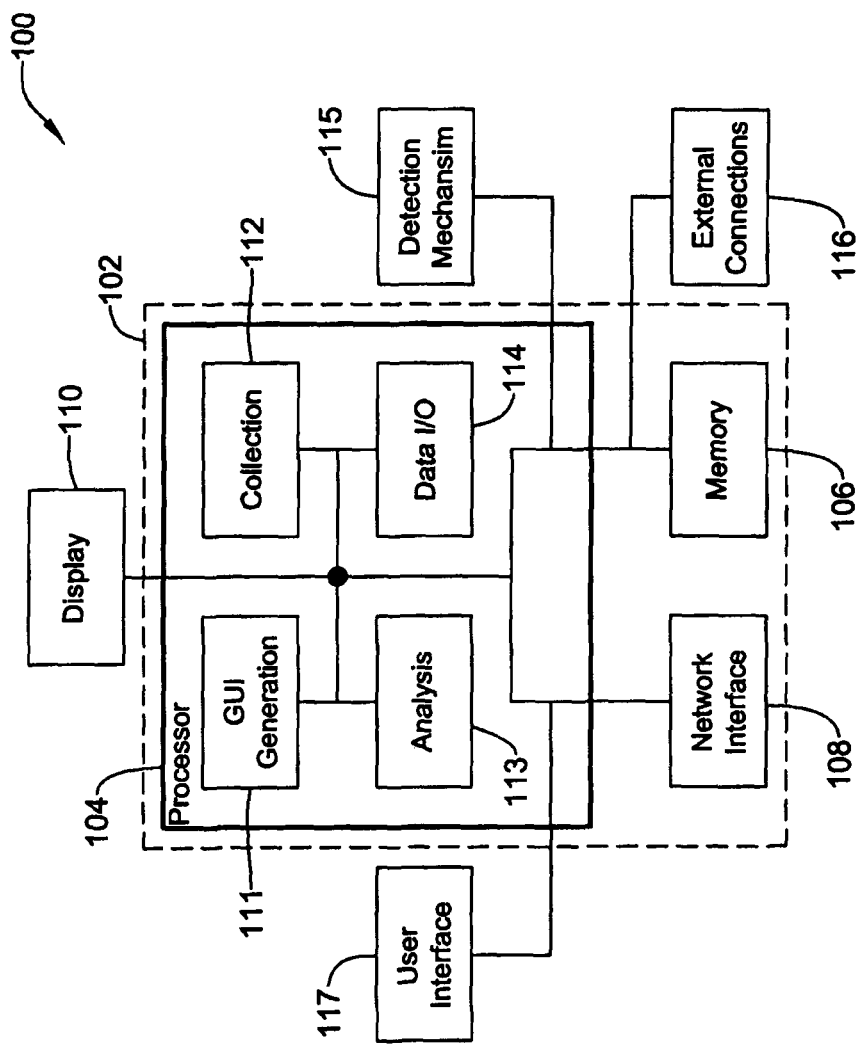
FIG. 1 is a diagram of an apparatus used in conjunction with accomplishing various aspects presented in the present disclosure.

FIG. 1 illustrates an example apparatus 100 for obtaining, processing and displaying energy-related information according to the present disclosure. Other examples of the apparatus 100 may be used. Apparatus 100 may be used to provide graphical user interfaces, visualizations and dashboards for displaying energy-related information according to the present disclosure. Other kinds of graphical user interfaces, visualizations and dashboards may be provided by apparatus 100.

As shown in FIG. 1, the apparatus 100 may incorporate a processing system 102 for processing energy-related data and generating graphical displays. The term "energy" may represent any suitable utility, such as electricity, gas, fuel oil, cold water, hot water, steam, or the like. The processing system 102 in this example may incorporate at least one processor 104, at least one network interface 108, and at least one memory 106. The processor 104 may process the energy-related data and generate the graphical displays. The processor 104 may incorporate virtually any suitable processing or computing component.

Memory 106 may be coupled to the processor 104. The memory 106 may be used to store instructions and data used, generated, or collected by the processor 104. The memory 106 may, for example, store the energy-related data collected and analyzed by the processor 104 and analysis results generated by the processor 104. The memory 106 may represent a suitable volatile and/or non-volatile storage and retrieval device or devices.

The network interface 108 may support communication with external components, such as an external database or external sensors. The network interface 108 may, for example, receive temperature readings from sensors, energy usage readings from meters, or any other or additional energy-related data. The network interface 108 may incorporate virtually any suitable structure for facilitating communications over one or more networks, such as an Ethernet interface or a wireless transceiver. Other connections may be accomplished with an external connections module 116.

At least one item or display 110 may be coupled to the processing system 102. The display 110 can present various kinds of information to one or more users. For example, the display 110 could present one or more graphical user interfaces containing graphs and/or other information related to energy usage. This may allow, for example, energy analysts or other personnel to review the analysis results and identify energy-related issues with an enterprise or other entity. Item 110 may represent any suitable display device, such as a liquid crystal display (LCD), cathode ray tube (CRT) display, light emitting diode (LED) display, or other type of visual information providing mechanism.

In the present examples, the processor 104 may perform various functions for supporting the collection and analysis of energy-related data. For example, the processor 104 may support data input/output (I/O) functions with a data I/O module 114 to support communication with other components, such as input devices (like a mouse or keyboard) at a user interface 117 and output devices (such as display 110). Processor 104 may also perform collection functions with collection module 112 and detection mechanism 115 to collect data related to the energy usage of one or more enterprises. Processor 104 may further perform operations and functions at an analysis module 113 to analyze collected data, such as cost-savings calculations and normalization functions, and perform other analyses and calculations. In addition, processor 104 may perform graphical user interface generation functions at GUI generation module 111 to generate one or more graphical user interfaces for presentation to one or more users. The contents of the generated graphical user interfaces may depend, at least in part, on the analysis performed by various portions of the processor 104. Example graphical user interfaces, graphs, tables, maps and the like are illustrated herein. Each of these graphical presentations, visualizations, dashboards, and the like may be implemented using any suitable hardware, software, firmware, or combination thereof, shown in FIG. 1.

The apparatus 100 shown in FIG. 1 may be used in a larger system, such as a process control system used to control one or multiple industrial facilities. In these arrangements, apparatus 100 may communicate with sensors, controllers, servers, or historian mechanisms in the process control system to gather data for analysis. These communications may occur over Ethernet or other wired or wireless network or networks. Also, in the illustrative examples, apparatus 100 may represent any suitable device in the process control system, such as a server or operator station. In other illustrative examples, the apparatus 100 may analyze data from multiple enterprises, and data for each enterprise may be provided to the apparatus 100 or retrieved by the apparatus 100 in any suitable manner.

In one aspect of operation, the apparatus 100 may analyze energy-related data and provide graphical interfaces and presentations based on the analyses to energy analysts or other personnel. For instance, apparatus 100 may receive and analyze data associated with various enterprises, such as for an entity having multiple individual locations or sites. Also, apparatus 100 may be used to analyze any suitable energy-related aspects of that domain, such as energy financial costs, parameters, and so forth as indicated herein.

In some illustrative examples, apparatus 100 may provide improved data visualizations (graphical displays) for energy analysts or other users, which may be useful in detecting and diagnosing issues in energy use. For instance, a visualization may integrate reports and graphs used by a user into a single interactive display. Depending on an implementation, such visualization may involve an integration of different displays, linking of symbols to detailed information for specific sites (areas, shapes, colors, shades, symbols, and so on associated with energy usage), integration of histories, linking of views, and providing time-based views. Shades may be instances of a grayscale or variants of an intensity of a displayed color such as a grey.

Apparatus 100 may also use a set of performance metrics in the data visualizations, where the metrics serve to highlight potential energy use issues at a site or other place. A user may be able to select one of those measures, which may then be used to drive an integrated display of charts. These metrics can be applied to analyze energy performance over a user-selectable period of time.

Although FIG. 1 illustrates an example apparatus 100 for displaying energy-related information, various changes may be made to the apparatus. For example, the apparatus 100 may include any number of processing systems, processors, memories, and network interfaces. Also, the apparatus 100 may be coupled directly or indirectly to any number of displays, and more than one apparatus 100 may be used in a system. In addition, FIG. 1 illustrates one example operational environment where the processing of energy-related data may be used. This functionality could be used with any other suitable device or system.

Figure 2:
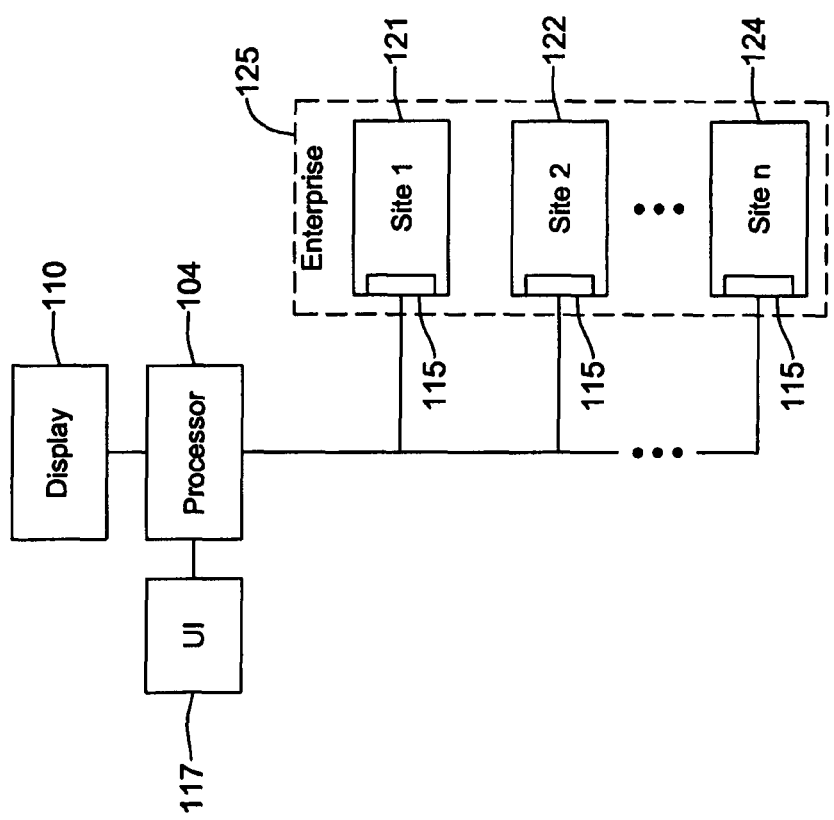
FIG. 2 is a diagram of a processor with a display and user interface, connected to an enterprise of sites.

FIG. 2 is a diagram of processor 104, with display 110 and user interface (UI) 117, connected to an enterprise 125 of n sites incorporating sites 121, 122, and 124 which represent site 1, site 2, and additional sites through site number n, respectively. Each site may have a detection mechanism 115 connected to it. Mechanism 115 may obtain data relative to each of the respective sites, pertaining for instance to energy consumption and the like.

Figure 3:
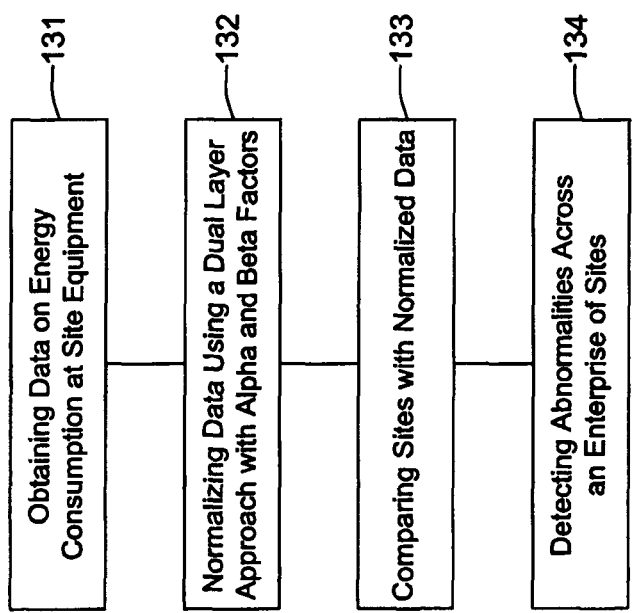
FIGS. 3 and 4 are diagrams of activity for energy-related information presentation systems.

FIG. 3 is a diagram of example basic activity of an energy related information presentation system. This activity may be performed by apparatus 100 or other mechanism. Symbol 131 indicates obtaining data on energy consumption at site equipment. Example equipment may incorporate heating, ventilation and air conditioning (HVAC), and lighting. The data may be normalized with a dual layer approach using alpha and beta factors, as indicated in symbol 132. The normalized data may be used to compare sites as indicated in symbol 133. The comparison of sites may aid, as indicated in symbol 134, in detecting abnormalities across an enterprise of sites.

Figure 4:
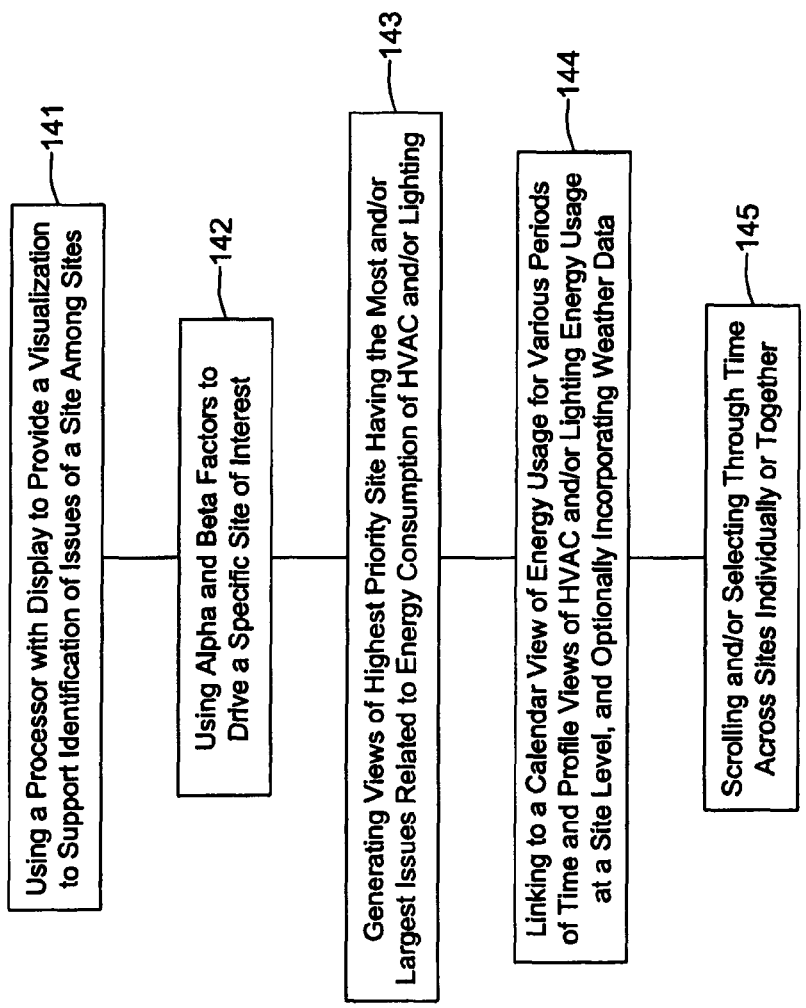

FIG. 4 is a diagram of activity of an energy-related information presentation system. This activity may be performed by apparatus 100 or other mechanism. Using a processor with a display may provide a visualization to support identification of issues of a site among sites, as indicated in symbol 141. Symbol 142 indicates using alpha and beta factors to drive a specific site of interest. Then there may be a generating of views of a highest priority site having the most and/or largest issues related to energy consumption of an HVAC and/or lighting, as noted in symbol 143. A linking to a calendar view of energy usage for various periods of time and profile views of HVAC and/or lighting energy usage at a site level, and optionally incorporating weather data may be performed, as indicated by symbol 144. According to symbol 145, there may be a scrolling and/or selecting through time across sites individually or together.

Figure 5:
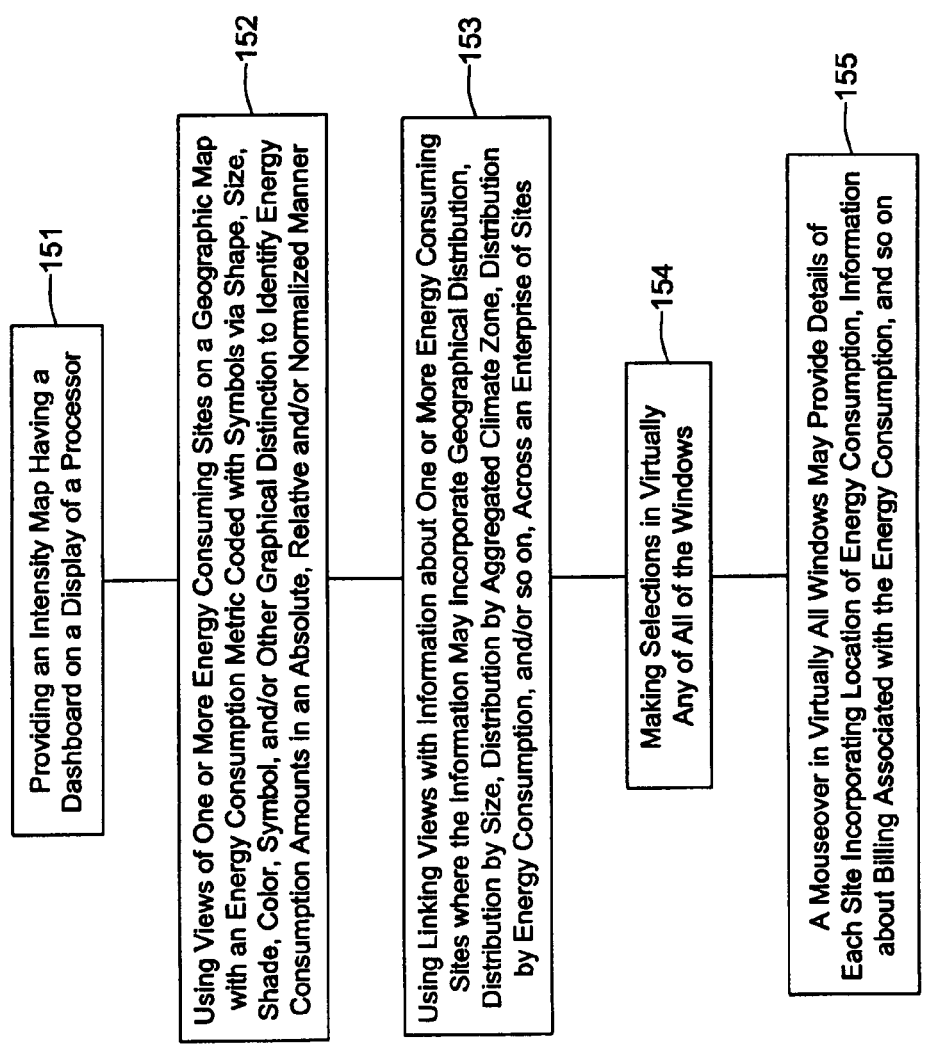
FIG. 5 is a diagram of a dashboard-oriented energy-related information presentation approach.

FIG. 5 is a diagram of activity for a dashboard oriented energy-related information presentation approach. This activity may be performed by apparatus 100 or other mechanism. A display of a processor may provide an intensity map having a dashboard, as indicated by symbol 151. Symbol 152 may note using views of one or more energy consuming sites on a geographic map with an energy consumption metric coded with symbols via shape, size, shade, color, symbol, and/or other graphical distinction to identify energy consumption amounts in an absolute, relative and/or normalized manner. There may be a use of linking views with information about one or more energy consuming sites where the information may incorporate geographical distribution, distribution by size, distribution by aggregated climate zone, distribution by energy consumption, and/or so on, across an enterprise of sites, as indicated in symbol 153. Symbol 154 notes that there may be a making of selections in virtually any of all windows. A mouseover in virtually all windows may provide details of each site incorporating location of energy consumption, information about billing associated with the energy consumption, and so on. A window may be a screen or graphical presentation. One or more windows may be on a display at the same time or at different times.

Various Figures herein illustrate example graphical user interfaces, visualizations and dashboards for displaying energy-related information according to the present disclosure. Other kinds of graphical user interfaces, visualizations and dashboards may be used.

Energy analysis services may be provided for customers that have multiple sites located across the country. There may be an effort to provide recommendations on how to better operate these sites, using a combination of utility bill data, electric or other utility meter data, control system operational data, and weather conditions. A challenge in providing these services may be in sifting through a massive amount of data to identify actionable recommendations that can be implemented at the customer's site, and to perform this activity in a cost effective manner.

Diagnostic visualizations for building control systems data may be noted. A present approach may address analyzing the HVAC and lighting systems at an individual site, and comparing their performance against other sites and/or comparing them over time at the same site.

A focus of the approach may be on a development of a similarity metric to compare operations between sites, and visualizations to support an energy analyst in quickly identifying sources with issues in the HVAC and lighting systems.

The present approach may have a definition of normalizing factors across sites, so that sites with varying equipment levels can be compared automatically. These normalizing factors may be called alpha and beta, and be defined on a per site basis. There may be an approach for visualizing the normalizing factors.

There may be a use of HVAC and lighting data for a single site in a calendar view. This view may allow an analyst to quickly assess performance over time, and compare same day performance for the same site. This view may facilitate an assessment of whether an issue is persistent or sporadic. Other approaches may look at individual trend plots.

There may be an incorporation of HVAC and lighting data into a "birthday cake" view for each day. This view may allow an analyst to develop a characteristic profile for a site, and use this characteristic profile as a comparison within sites and between sites.

In the present disclosure, one may have an approach to normalize HVAC and lighting operations between sites. Essentially, one may define a factor, called an alpha ($\alpha$) factor, for each stage of lighting or HVAC equipment, and for each piece of equipment at the site. This may require that data be available in a form that separates the pieces of equipment and stages of operation. Then, for each of these stages and pieces of equipment, one may define a daily period of operation, such as unoccupied hours; and an aggregation period, such as one month. The alpha factor may then be used to calculate the percentage of those operation and aggregation periods where this stage of equipment/lighting was activated.

Another step or stage of normalization may invoke collecting virtually all of the alpha factors for a single site, and then normalizing them by a number of pieces of equipment at that site. The normalization may be referred to as a beta ($\beta$) factor. For example, one may have alpha factors for eight rooftop HVAC units at one site, and six rooftop HVAC units at another site. To normalize between sites, one may sum the alpha factors and divide by the number of units at each site. Thus, the beta factor may be the fraction of time that that total site capacity was activated during the aggregation period.

An example of a calculation for alpha and beta factors, and an example of a visualization of alpha calculations across sites, are shown herein.

The alpha and beta factors may be intended to either provide an automated metric for comparison, or to assist the analyst in identifying sites that are candidates for a further drill down.

Figure 12:
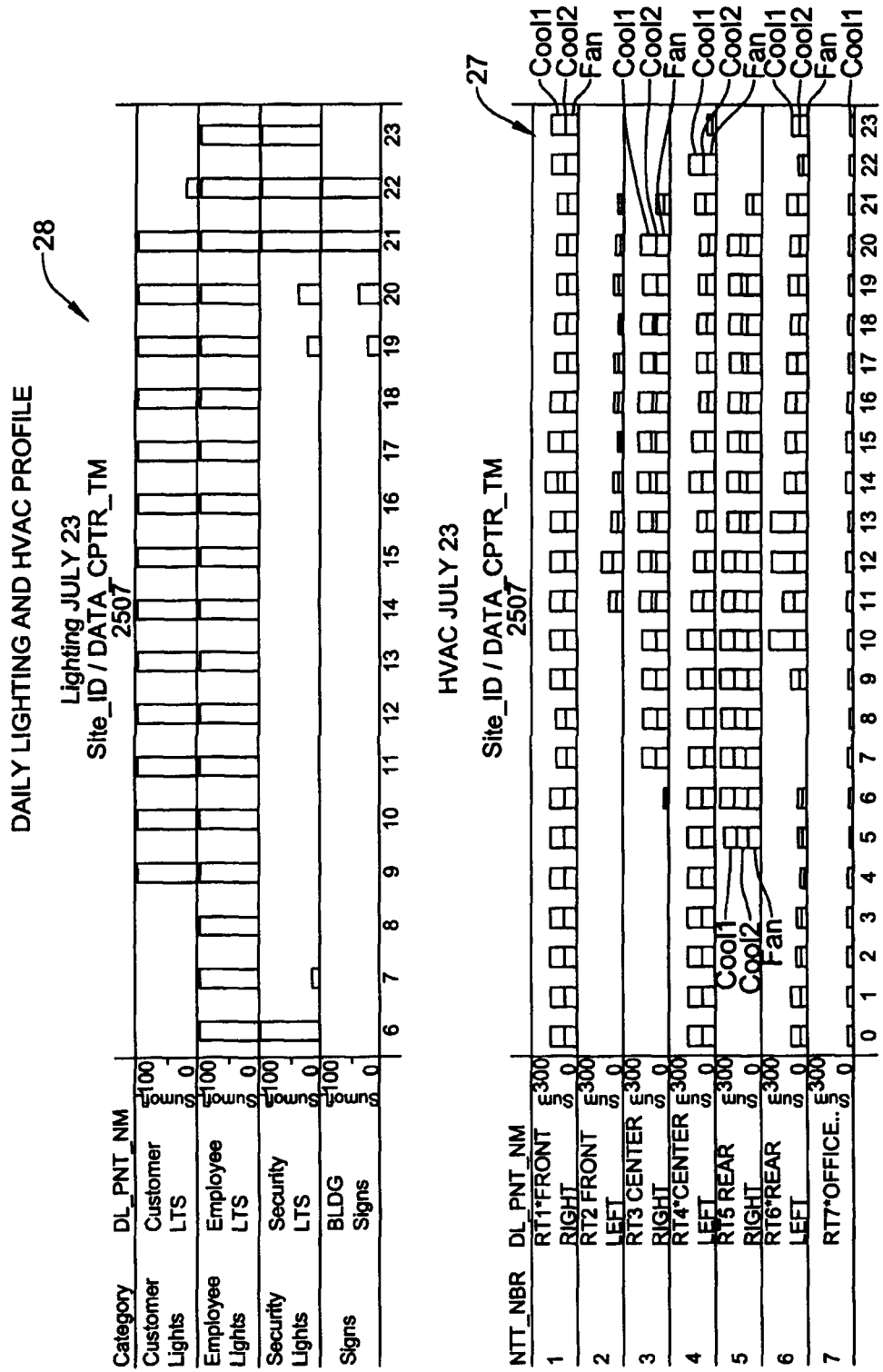
FIG. 12 is a diagram of a daily lighting and heating, ventilation and air conditioning system profile.
Figure 13:
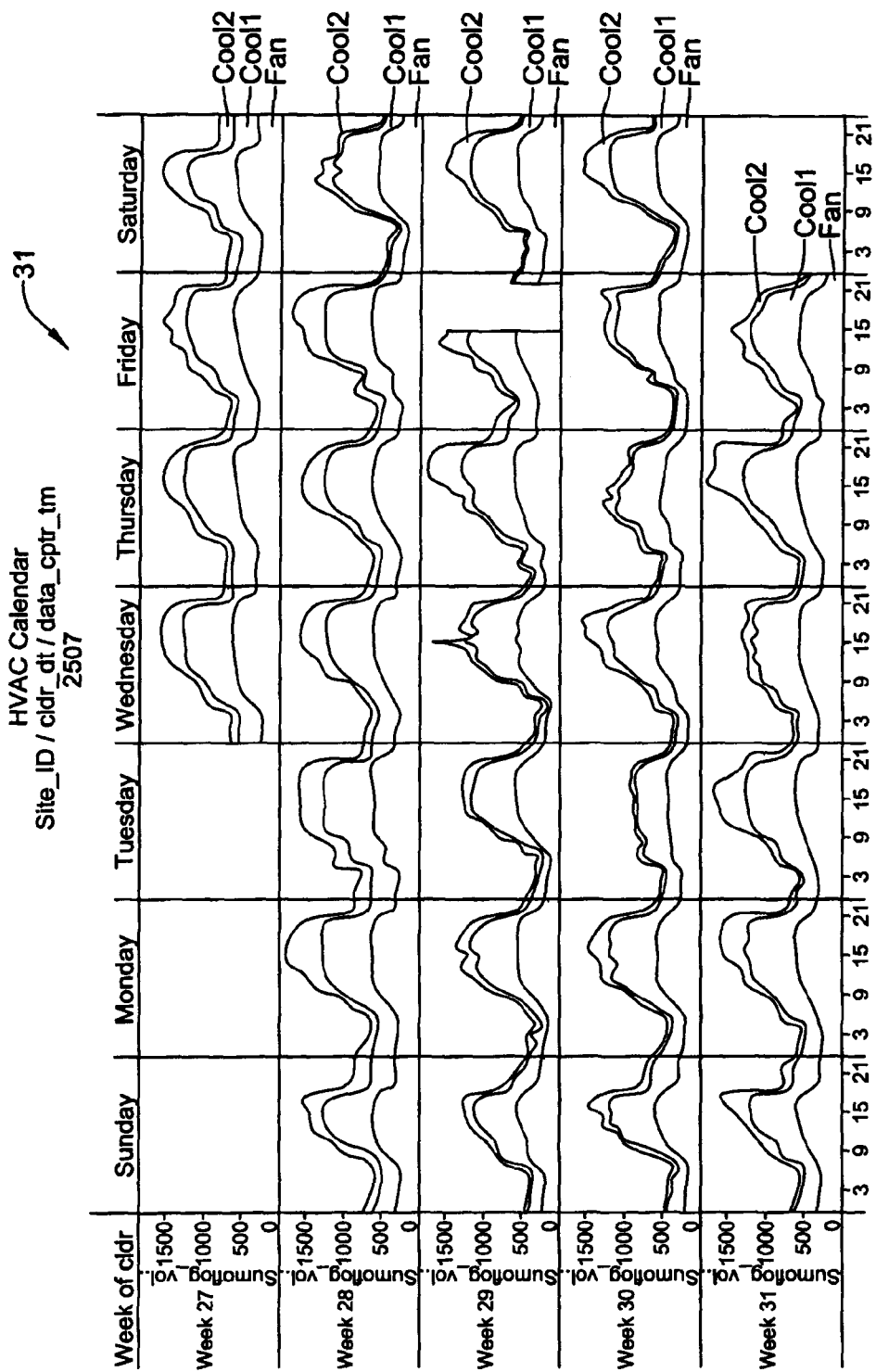
FIG. 13 is a diagram of a heating, ventilation and air conditioning calendar.
Figure 14:
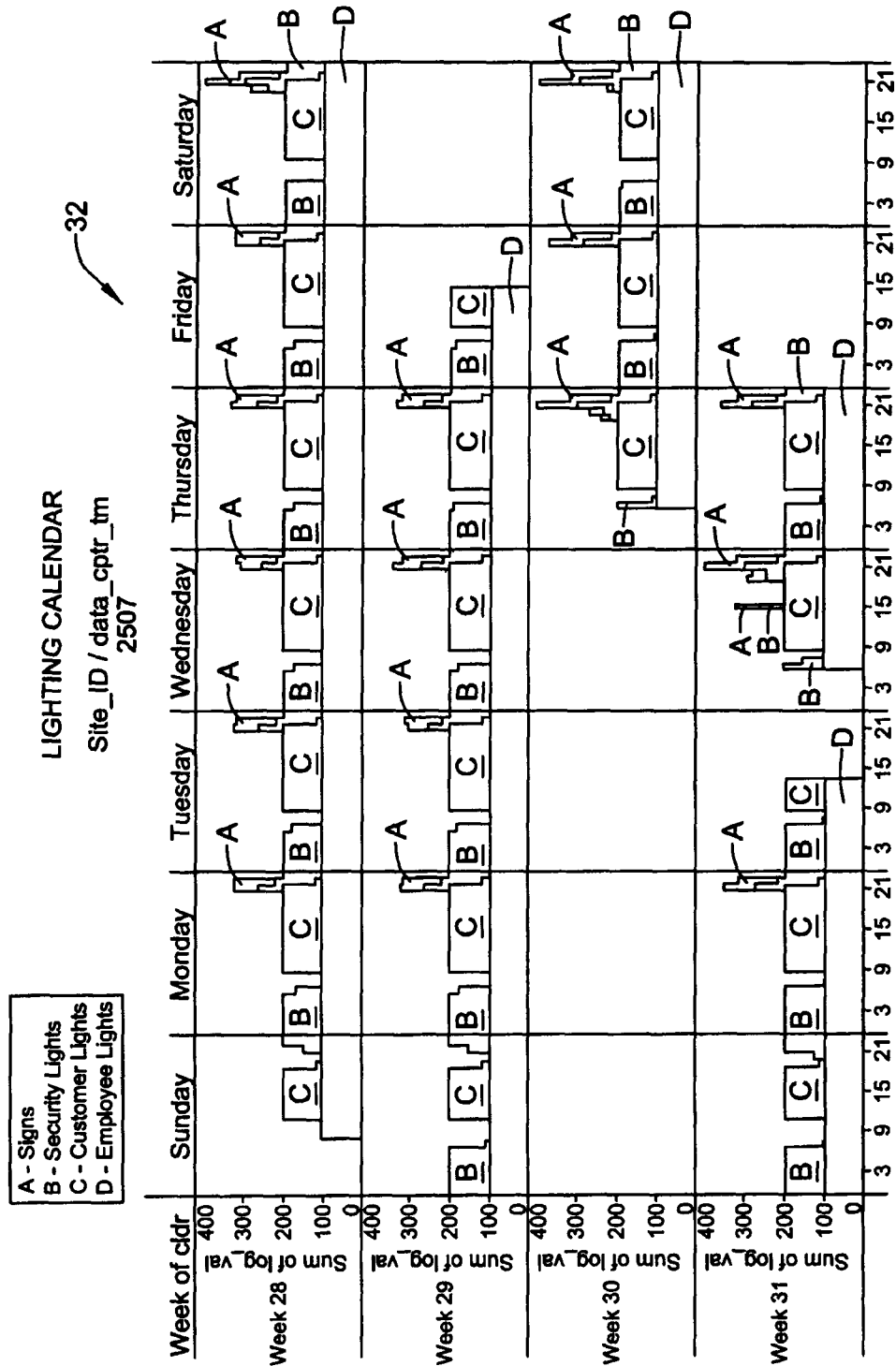
FIG. 14 is a diagram of a lighting calendar.
Figure 15:
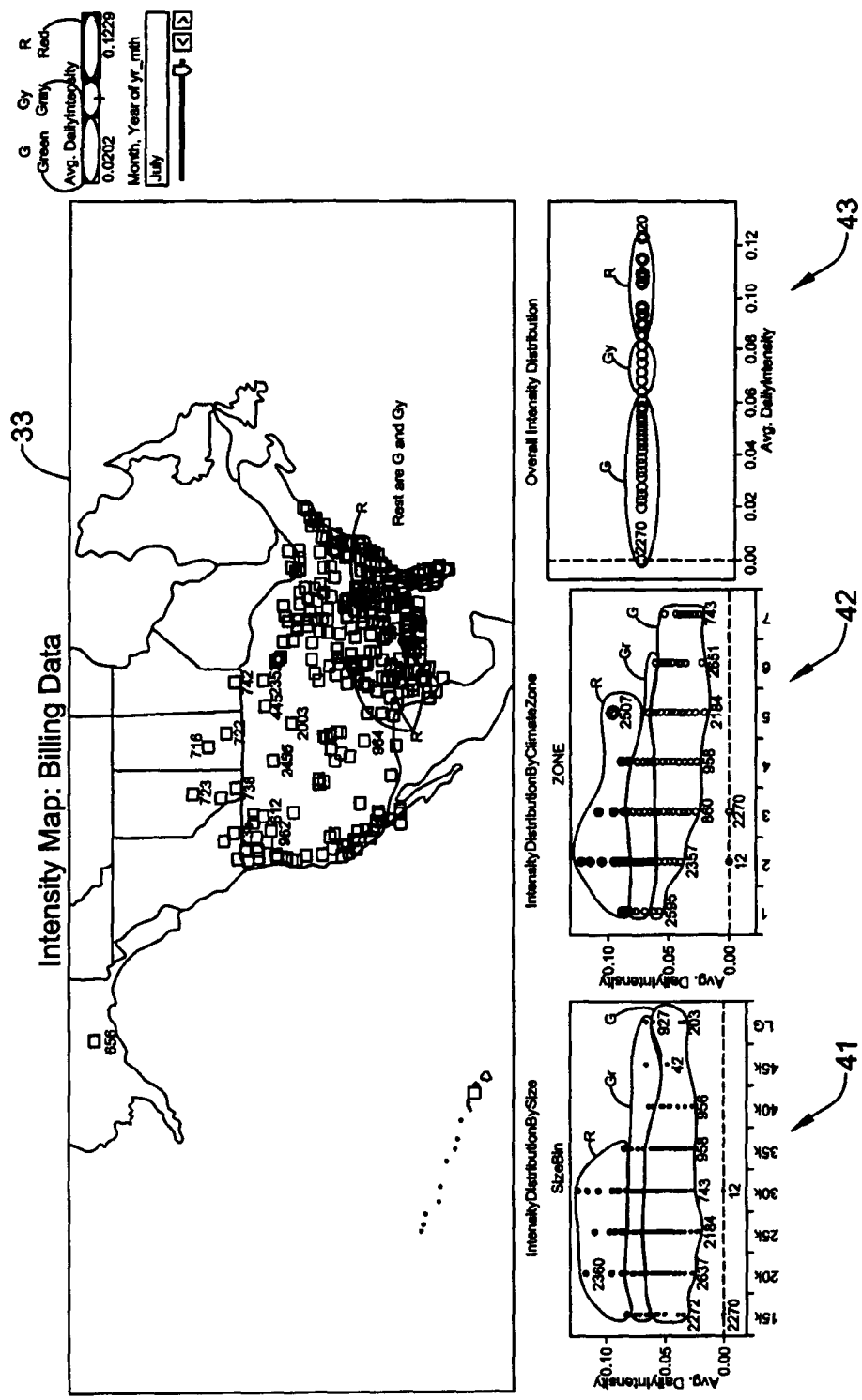
FIGS. 15-18 are diagrams of screen shots of an approach utilizing a key metric of intensity to view customer sites by normalized consumption.

FIG. 12 shows charts with site details with daily profiles 27 and 28 for HVAC and lighting, respectively. FIG. 13 shows an HVAC calendar 31 with site details. FIG. 14 shows a lighting calendar 32 with site details. FIGS. 12, 13 and 15 are data instances with rough accuracy as examples for illustrative purposes.

Once a site is selected for the further drill down, the analyst may need views to support rapid identification of specific issues in the HVAC and lighting systems. FIG. 13 shows the HVAC calendar 31 for a specific site (2507). This visualization may be used to illustrate the operation of the HVAC systems across the aggregation period. In the view shown here, one may see the operation of a single site across a one month period, and then use this view to identify when heating, cooling and fan stages are operating across the aggregation period. This may allow an analyst to see an entire month's data in a single view, and rapidly identify operational issues such as running HVAC systems during unoccupied periods. A similar approach with a calendar 32 for lighting systems is shown in FIG. 14.

Eventually, a daily detail view may be used as a bottom level drill down into the data. As noted herein, FIG. 12 may show the profiles 27 and 28 with details summarized in the HVAC and lighting calendars 31 and 32 in FIGS. 13 and 14, respectively, but at a finer level of detail for a single day, with each subsystem charted individually.

One approach may involve a monthly site review. One may find n outlier sites via meter data, utility bill data, or a "big three report". For each of these outliers, the following items may be done. 1) One may find m "similar" reference sites. A similarity metric may currently be a distance between postal codes. One may also incorporate a number of RTUs, total RTU tonnage, square footage. 2) The similarity metric may be precomputed and stored in a file in prototype, which could be a table in the warehouse or other place. 3) The RTU data may be pulled up for the comparison site, and for the m reference sites. For instance, total run time may be evaluated during unoccupied periods, total run time may be evaluated for all RTUs during occupied periods, and/or the metric may be computed on an unoccupied comparison vs. reference and/or occupied comparison vs. reference. 4) Lighting data may be pulled up for the comparison site, and for the m reference sites. A similar evaluation may be done as for the RTUs. 5) The results may be comparison metrics, such as RTU run time (occupied, unoccupied), LIGHTS run time (occupied, unoccupied) for each site, and so forth. An approach may incorporate examining how the total run times for this site compare to the reference sites. 6) Visualization of a comparison and selected reference site may be shown. An approach here may incorporate examining how the total run times for this site compare to those of the reference sites. Examples may pertain to RTU stages (heat & cool), fan status, lighting status, and so forth. RTU may be referred to a rooftop unit associated with an HVAC system.

Figure 6:
FIG. 6 is a diagram of a formula for calculating an alpha factor.

An approach for normalizing RTU log data may be noted. A way to normalize the RTU data may be needed, so that one can compare across stores. This approach may be done in two stages: 1) Normalizing at the equipment/unit level; and 2) Normalizing by total site capacity. An assumption may be to work with a single point for each normalized calculation, e.g., COOL 1. One may define $\alpha_{i,j,k}$=sum of run time for site i, stage j, RTU k, in percent, across a specified time of day and date range for a specific RTU divided by 100 percent*n hours*n days according to a formula 11 in FIG. 6. This formula may represent the fraction of time in the specified period, where this stage or fan was running on a single RTU.

One may define $\beta_{i,j}$=the sum of all $\alpha_{i,j,k}$ for a site divided by the total number of RTUs at this site. A formula 13 for the beta ($\beta$) calculation is shown in FIG. 7. This may be the fraction of time that the total site capacity for that stage which was on during the specified period. One may then compare beta factors across sites. A beta factor should virtually always have an associated time period and RTU stage. For instance, there may be a time range (midnight to 7 AM) and a state (unoccupied).

Figure 8:
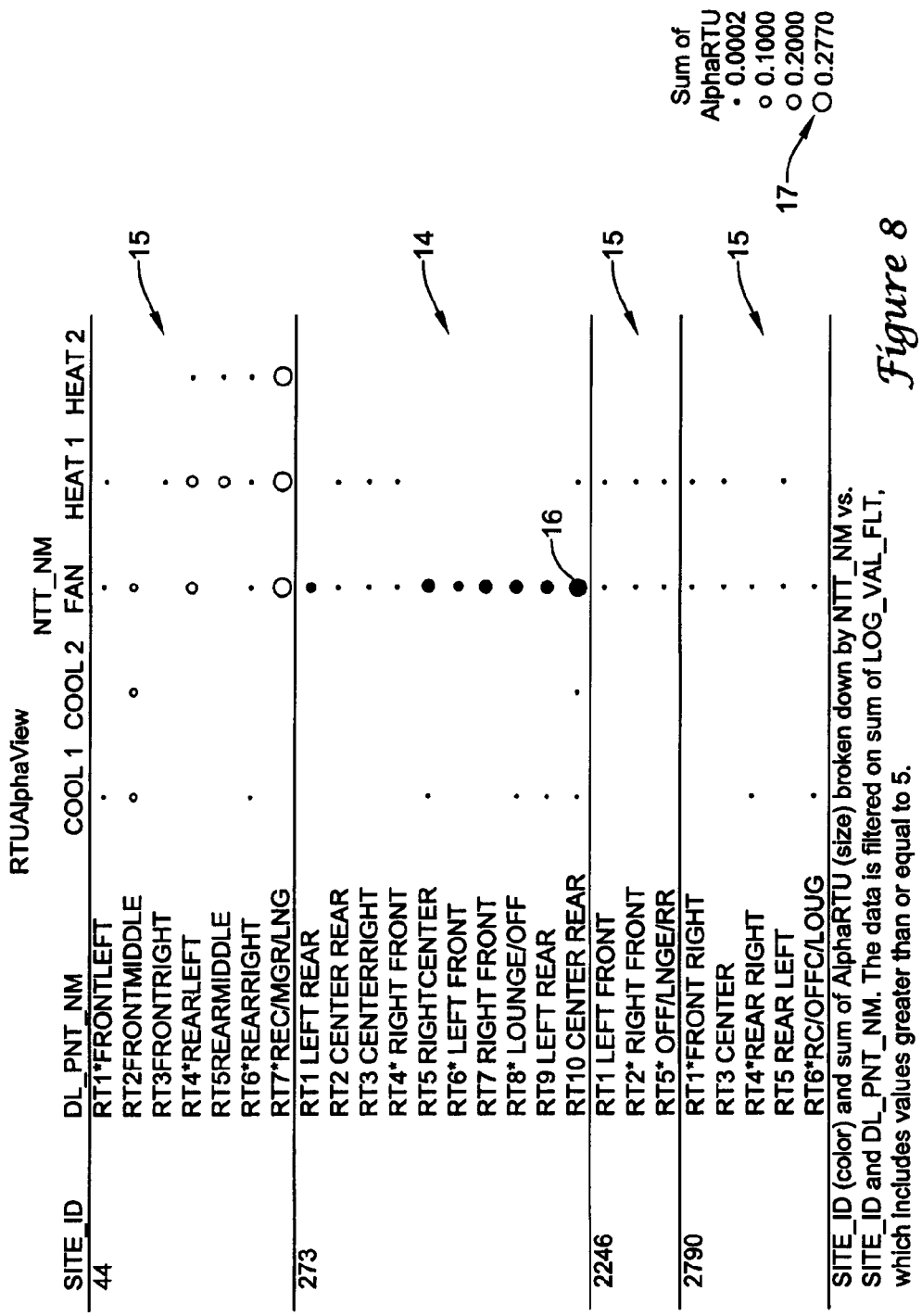
FIG. 8 is a diagram of an example an alpha calculation and view.

An example an alpha "α" calculation and view may be considered. In FIG. 8, site 273 at location 14 of the Figure may be compared with nearby sites 15, for instance, over the month of November and at a period between midnight and 9 am. A size of a circle may be proportional to the total amount of time running during this period in the date range, which may be a numerator of an alpha "α" calculation with formula 11 in FIG. 6. A question of which equipment is running for what fraction of the time and what stage is running may be asked. It may be seen that fan stages run regularly, with the "RTU10" running roughly 27 percent of the total time during this period, as indicated by a dot 16 and corresponding scale 17. SITE_ID (color or shade) and sum of AlphaRTU (size) may be broken down by NTT_NM vs. SITE_ID and DL_P-NT_NM. The data may be filtered on a sum of LOG_VAL_FLT, which includes values greater than or equal to 5.

Figure 9:
FIG. 9 is a diagram of a formula for calculating another alpha factor.

An approach for normalizing lighting log data may be considered. As with the RTU data, there may be a need for a way to normalize the lighting data, so that one can make a comparison across stores. One may assume to work with a single point for each lighting category, such as, for example, employee lights. One may define $\alpha_{i,j}$=sum of run time for site i and lighting category j, in percent, across a specified time of day and date range for a specific lighting category divided by 100 percent*nhours*ndays as shown in the formula 12 of FIG. 9. This formula may represent the fraction of time in the specified period, where this lighting category was on. One may define $\beta_{i,j}$=the sum of all $\alpha_{i,j}$ for a site divided by the total number of lighting categories for site i. This may indicate the fraction of time that the total site lighting was on during the specified period. One may then compare "β" factors across the sites and lighting categories. A "β" factor may virtually always have an associated time period and lighting category. There may be, for example, a time range (e.g., midnight to 7 AM) and a state (e.g., unoccupied).

Matlab™ may be used to calculate alpha (α) and beta (β) for the various sites as shown in FIGS. 10a and 10b, respectively. Example alpha calculations 21 for run hours may be made for site having an ID of 2507 (i.e., site 2507) and other sites, e.g., July 20XX, hours 12 AM-7 AM. Similarly, beta calculations 22 may be made relative to the same sites. FIG. 10c is a table 20 of distances of other sites nearby site 2507. Information particularly related to site 2507 may be noted in FIGS. 12-14.

Figure 11B:
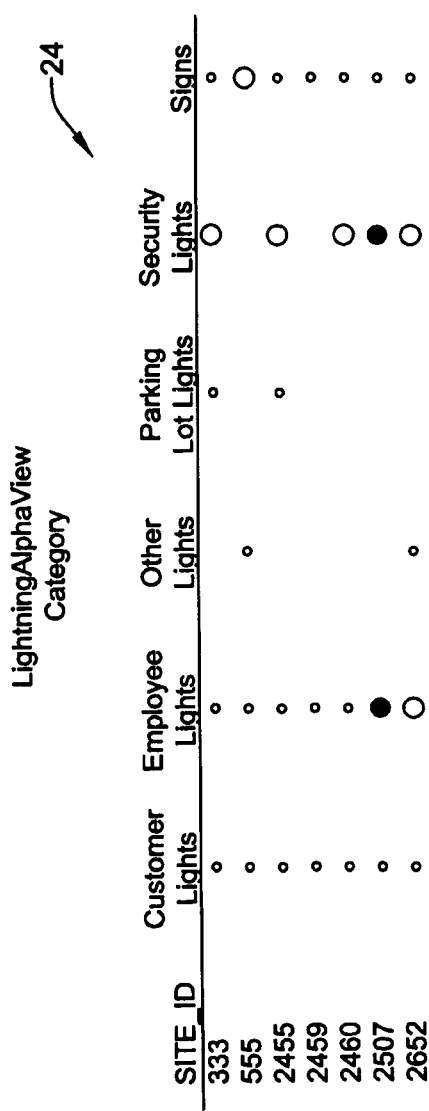

FIGS. 11a and 11b are views 23 and 24 of α calculations for various sites for RTU alpha and lighting alpha, respectively. For instance, site 2507 is shown at portion 25 of FIG. 11a in a darker shade with sizes of circles proportional to alpha (α). It may be noted that these results are not necessarily normalized for a number of RTUs. Observations may be of RTUs with significant run times and employee lighting with significant run times.

An approach may address a first step in identifying actionable recommendations—using the available data most effectively to identify and drill down to specific sites with energy conservation opportunities, with FIGS. 15-18 being considered.

The approach may provide a high level overview of the enterprise, based on a key metric selected by an analyst. An analyst may use monthly consumption totals normalized by site size and number of days in the billing period to identify outlier sites using a linked view. The main view may show the enterprise locations mapped geographically, with the key metric and site size mapped to a color or shade, and a shape of the icon representing each site. The main view may also be dynamically linked to multiple subviews that allow the user to simultaneously view the metric of interest cast onto multiple dimensions, such as size group, the climate group, and an overall histogram of the key metric.

With the multiple linked views, the analyst can quickly drill through an enterprise, and identify sites of interest for further investigation. Other approaches may use multiple static tables to rank sites, and the present approach may be differentiated from the others by both the geographic view and the linking of multiple subviews for an additional dimension.

FIGS. 15-18 are diagrams of screen shots of an approach noted herein. A key metric may be the intensity—viewing virtually all customer sites by normalized monthly consumption.

Normalized by square footage, a number of days in the billing period, and so forth, may result in kWh/SF/Day as a key metric. For the main view and virtually all subviews, the key metric may be encoded to a color or shade scale shown in the upper right hand corner of each of the FIGS. 15-17. The main views 33, 34 and 35, respectively, show a geographic distribution, with multiple subviews 41, 42 and 43 showing the distribution by size, distribution by aggregated climate zone, and overall intensity distribution across virtually all sites, respectively. One may select sites in any window for highlighting across windows.

One may scope out climate and consumption zones by several steps as in the following. There may be prioritization shown in FIG. 15 with a billing example in terms of a map 33 and graphs. One type of overview may be an intensity map which reveals viewing virtually all customer sites by normalized monthly consumption. Consumption may be normalized by square footage, number of days in billing period such as by kWh/SF/Day. There may be the geographic distribution, intensity distribution by size, intensity distribution by climate zone, and overall intensity distribution in subviews 41, 42 and 43, respectively, of FIGS. 15-17. Identification of sites may be allowed for further investigation. Sites may be selected in any window for highlighting across windows. A mouseover in any window may give site details, such as location, size, details on consumption and billing period, and so on.

Figure 16:
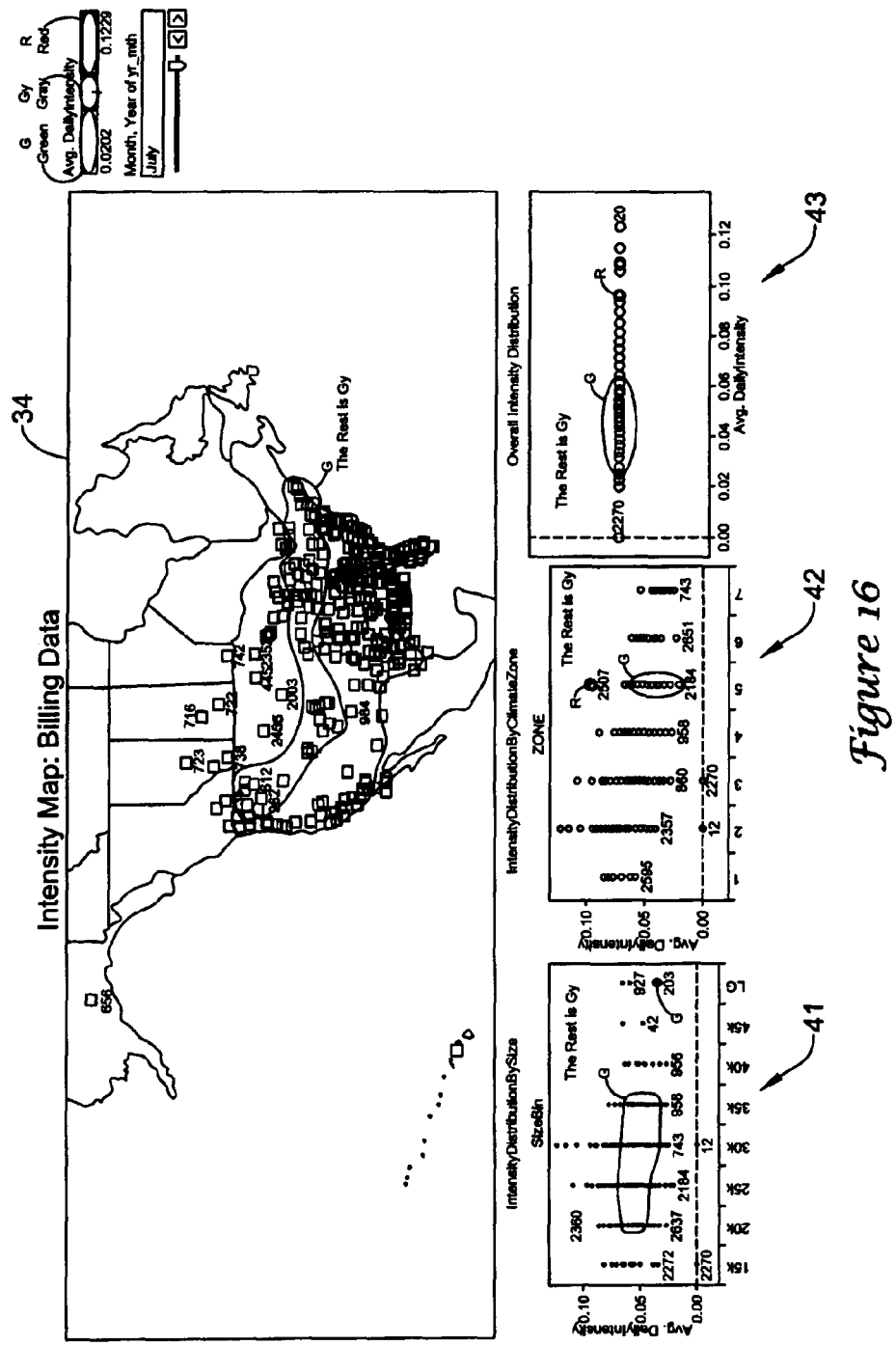

FIG. 16 shows an example of a selection by climate zone in subview 42 one of the subviews, and the resulting linked highlighting across other views. This concept may be known as yoking. What may be noted in the present approach is not necessarily the concept of yoking, but rather the use of the enterprise energy data, combined with site location and other site specific information, to aid an analyst in the task of identifying sites of interest for further investigation.

FIG. 16 is a map 34 and graphs which illustrate selection by climate zone. A climate zone window 42 may be used to drive selections. One may see sites of interest across map 34 and size distribution. Similar yoking may be done across subplots.

Figure 17:
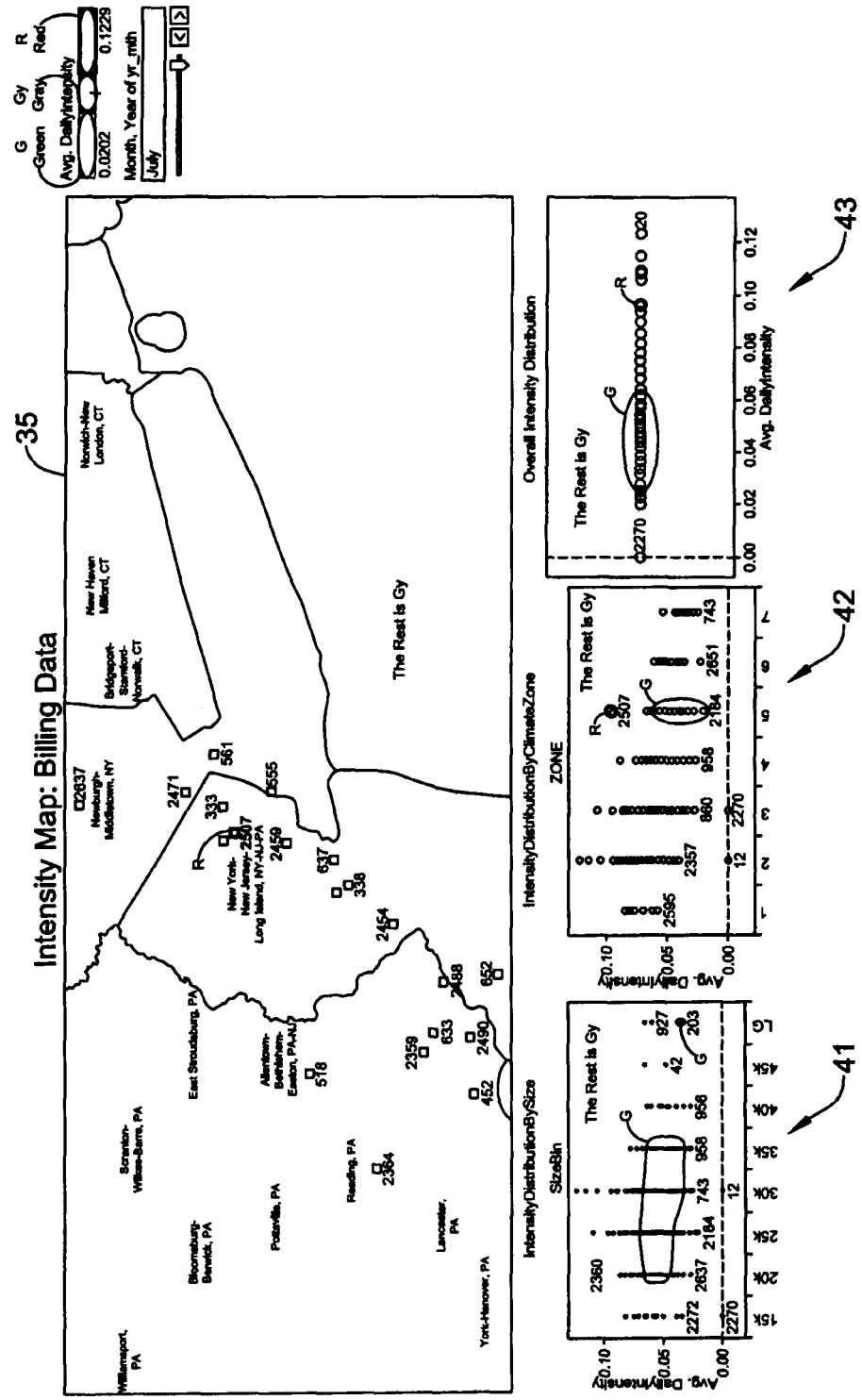

FIG. 17 shows an example of narrowing down to a specific site of interest, based on this site being an outlier in its climate zone. The climate view is shown in the lower middle window 42, and the most significant outlier for this climate zone may be selected. One may see that by selecting the site in the climate view, one will have identified its geographic location, and one can see how that site may rank in the overall distribution in the lower right hand window. One may also see how that site ranks compared to sites of similar size in the lower left hand window.

A mouseover in virtually any window may give site details (location, size, details on consumption & billing period)

Figure 18:
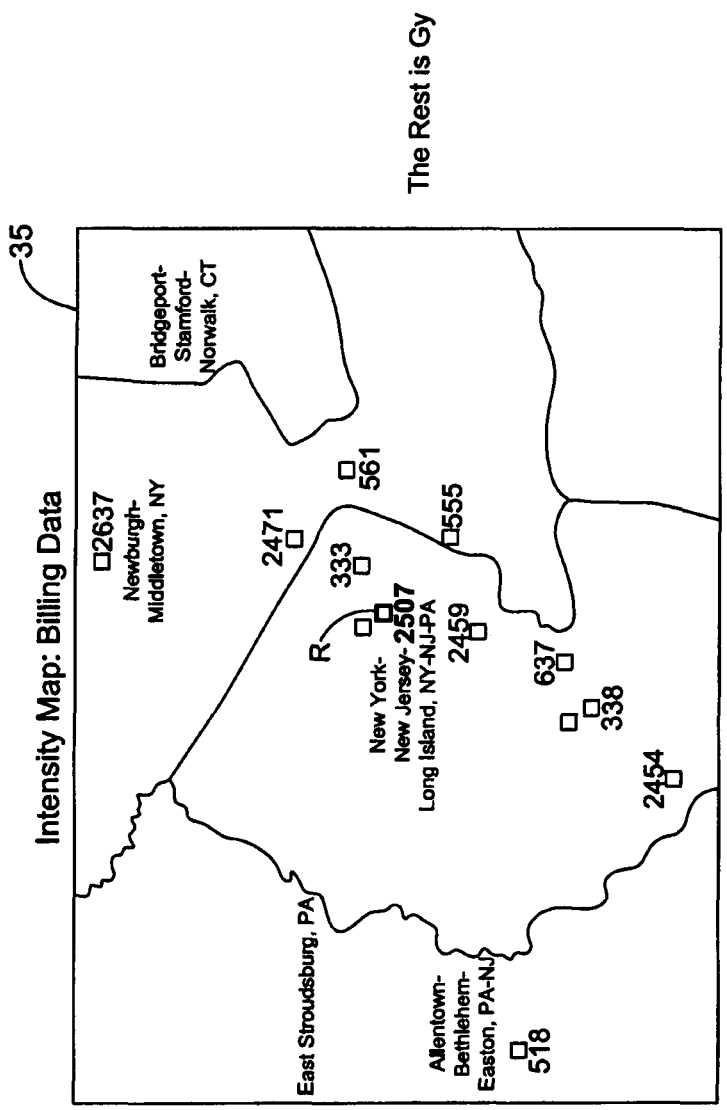

FIG. 17 is a map 35 and graphs showing how to narrow down to a site of interest. For instance, a question about where the high consumption zones in climate zone 5 are located may be asked. One may look at a meter and EMS details, and then compare these sites to nearby sites to understand the causes for higher consumption. It appears that a top consumer in zone 5 is site 2507, which may be located for instance in Totowa, N.J. Normalizing calculations may be used to highlight differences, and then one may drill down to store level details, as the sites may represent, for example, stores of a chain. A closer view of map 35 is shown in FIG. 18.

The following may be a recap. There may be automated anomaly detection based on normalization (alpha and beta), along with drill down to HVAC/lighting details. There may be a dual layer approach to normalization across sites, using logical data to build the normalization. This may incorporate the alpha and beta factors as defined herein, and this act to normalize for multiple instances of equipment within a site (e.g., multiple rooftop units).

The alpha factor may be used to normalize against "expected" operation. The alpha factor may aggregates equipment run time during a specified condition (e.g., unoccupied) over a specified period (e.g., one month).

The beta factor may aggregates for virtually all equipment on the site and normalizing based on total site capacity. The beta factor may provide an approach to compare sites against one another, by normalizing the aggregated alpha factors by a count of equipment.

The normalization may be based generally only on the content of the data, not other external factors. Alpha and beta factors may be operational measures driven by the content of the HVAC and lighting data, intended to evaluate abnormalities in operational procedures across a large enterprise.

Visualization may be to support rapid identification of specific problems by a human user. The visualization may be used with or without the alpha/beta factors. In the case where alpha/beta factors are available, the alpha/beta factors may be used in several ways. First, the alpha/beta factors may be used to drive the user to a specific site of interest, and automatically generate views of the highest priority site. Second, the alpha/beta factors may be used to supplement the raw HVAC/lighting information and provide an approach for a human user to quickly compare a single site against other similar sites.

A specific element of the visualization may be a link to a calendar view for comparison across days of week and weeks of the month and weeks of the year. The content of the calendar view may be lighting data, HVAC data, or a combination of both. The calendar view may also include weather data. The calendar view may have scrolling and selection capability to support quick navigation through time and across sites.

Another specific element of the visualization may be a link to a detailed daily profile view for analysis of the operation of specific pieces of equipment at the site level. This view may incorporate a simultaneous overview of lighting and HVAC data for grouped lighting functions and for specific HVAC units. The view may highlight individual operating stages for each piece of HVAC equipment over a daily period. The view may incorporate a capability to scroll through time for a specified site.

An intensity map may be noted. A dashboard may be for viewing multiple energy consuming sites where an energy consumption metric is presented on a geographic map and the energy consumption metric is coded via shape and/or size and/or color to identify largest deviations in the metric. The dashboard may also incorporate one or more linking views that provide the user with contextual information, such as geographic distribution, distribution by size, distribution by aggregated climate zone, distribution across all sites to show consumption in the overall context of the enterprise.

The dashboard may also provide an ability to make selections in any window and have that selection linked across all windows. Mouseovers in virtually all windows may provide additional contextual details for each site relevant to energy consumption, such as location, size, details on energy consumption and the associated billing period.

A relevant document may be U.S. patent application Ser. No. 12/259,959, filed Oct. 28, 2008, and entitled "Apparatus and Method for Displaying Energy-Related Information." U.S. patent application Ser. No. 12/259,959, filed Oct. 28, 2008, is hereby incorporated by reference. A relevant document may be U.S. patent application Ser. No. 12/483,433, filed Jun. 12, 2009, and entitled "Method and System for Providing an Integrated Building Summary Dashboard". U.S. patent application Ser. No. 12/483,433, filed Jun. 12, 2009, is hereby incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. An energy-related information presentation system comprising:
   a processor; and
   one or more detectors for obtaining data on instances of heating, ventilation and air conditioning and/or lighting equipment at one or more sites of an enterprise; and
   wherein:
   the one or more detectors are connected to the processor;
   the processor receives the data from the one or more detectors on instances of the heating, ventilation and air conditioning and/or lighting equipment at the one or more sites;
   the processor outputs a normalization of the equipment across the one or more sites based on data on instances of the equipment;
   an instance of the equipment is an RTU;
   the normalization comprises alpha and beta factors;
   the alpha ($\alpha$) and beta ($\beta$) factors are used to build the normalization for instances of the equipment of the one or more sites;

$$\alpha_{i,j,k} = \frac{\sum_{nDays}\sum_{nHours} \% \, ON}{100 * nDays * nHours}$$

$$\beta_{i,j} = \frac{\sum_{nUnits} \alpha_{i,j,k}}{nUnits}$$

$\alpha_{i,j,k}$=sum of run time for site i, stage j, RTU k, in percent, across a specified time of day and date range for a specific RTU divided by 100 percent * n hours * n days; and $\beta_{i,j}$ =the sum of all $\alpha_{i,j,k}$ for a site divided by the total number of RTUs at this site.

2. The system of claim 1, wherein the processor outputs automated anomaly detection based on the normalization.

3. An energy-related information presentation system comprising:
a processor; and
one or more detectors for obtaining data on instances of heating, ventilation and air conditioning and/or lighting equipment at one or more sites of an enterprise; and
wherein:
the one or more detectors are connected to the processor;
the processor receives the data from the one or more detectors on instances of the heating, ventilation and air conditioning and/or lighting equipment at the one or more sites;
the processor outputs a normalization of the equipment across the one or more sites based on data on instances of the equipment;
the data from the one or more detectors provide a basis for a drill down to details of the heating, ventilation and air conditioning and/or lighting equipment;
the processor provides a dual layer approach to the normalization of the equipment across the one or more sites, using data of instances of the equipment to build the normalization;
the normalization comprises alpha and beta factors;
the alpha ($\beta$) and beta ($\beta$) factors are used to build the normalization for instances of the equipment of the one or more sites;
the alpha factor is used in the processor to normalize against an expected operation of the instances of equipment; and
the alpha factor aggregates run time of the equipment at a specified condition during a specified period.

4. The system of claim 3, wherein the processor, for the beta factor, aggregates alpha factors for virtually all instances of equipment on a site and provides the normalization based on a total capacity of the equipment at the site.

5. The system of claim 4, the processor, with the beta factor, compares sites against one another, with a normalization of an aggregation of alpha factors by a count of the instances of equipment for each site.

6. The system of claim 4, wherein:
the normalization is based at least partially on the data; and
the alpha and beta factors are operational measures driven by data of instances of the heating, ventilation and air conditioning and/or lighting equipment.

7. The system of claim 4, wherein the alpha and beta factors are used by the processor to evaluate abnormalities in operational procedures across an enterprise of the instances of equipment at the one or more sites of the enterprise.

* * * * *